United States Patent [19]

Murakami

[11] 4,429,483

[45] Feb. 7, 1984

[54] AUTOMATIC RAT KILLING DEVICE

[76] Inventor: Hideaki Murakami, 724-3 Koikecho, Hamamatsushi, Shizuoka-ken, Japan

[21] Appl. No.: 358,909

[22] Filed: Mar. 17, 1982

[30] Foreign Application Priority Data

Apr. 25, 1981 [JP] Japan .................................. 56-62756

[51] Int. Cl.³ ............................................ A01M 23/06
[52] U.S. Cl. ............................................ 43/70; 43/74
[58] Field of Search ................................ 43/74, 70, 69

[56] References Cited

U.S. PATENT DOCUMENTS

| | | | |
|---|---|---|---|
| 459,453 | 9/1891 | Buck | 43/74 |
| 464,479 | 12/1891 | Murphy | 43/74 |
| 854,867 | 5/1907 | Baker | 43/74 |
| 934,695 | 9/1909 | Reynolds | 43/70 |
| 1,384,611 | 7/1921 | Gorniak | 43/70 |
| 1,404,606 | 1/1922 | Harris | 43/74 |
| 1,726,167 | 8/1929 | Swint | 43/74 |
| 1,827,019 | 10/1931 | Joseph | 43/70 |
| 2,501,043 | 3/1950 | Giacoletto | 43/69 |

*Primary Examiner*—Gene Crosby

[57] ABSTRACT

An automatic rat killing device includes a box having an opening at its top and a stairway leading to its top. A pair of closure plates are pivotally mounted at their one ends on the box for movement between horizontal positions where the two closure plates are mated together at their other ends to close the opening and vertical positions where the closure plates are separated apart to open the opening. A solenoid is mounted on the box and has a stop lever normally engaged with the closure plates to hold them in their horizontal positions. A container holding a viscous liquid is removably accommodated within the box. A detector generates a detecting signal when a rat touches a bait. The solenoid is energized to move the stop lever out of engagement with the closure member so that the closure plates are moved to their vertical positions, thereby causing the rat to fall into the viscous liquid. A returning mechanism is operable to return the closure plates to their horizontal positions whereafter the stop lever is moved to engage the closure plates to retain them in their horizontal positions.

3 Claims, 5 Drawing Figures

AUTOMATIC RAT KILLING DEVICE

BACKGROUND OF THE INVENTION

Field of the Invention

This invention relates to a device for automatically catch and kill a plurality of rats at the same place in a consecutive manner.

One conventional rat killing device comprises a box containing water, and a shut-off plate arranged in the water for movement between opened and closed positions so that a rat entrapped in the water is prevented from coming up to the surface of the water, thereby drowning the rat to death. However, this conventional rat killing device is rather complicated in construction so that the shut-off plate often fails to operate properly. Thus, this device can not drown the entrapped rat to death without fail.

SUMMARY OF THE INVENTION

It is therefore an object of this invention to provide an automatic rat killing device which is reliable in operation, easy in maintenance, inexpensive to manufacture, and can effectively catch and kill a plurality of rats at the same place in a sanitary and consecutive manner.

According to the present invention, there is provided a rat killing device which comprises a box having an opening at its top and a stairway leading to its top; a pair of closure plates pivotally mounted at their one ends on the box for movement between horizontal positions where the two closure plates are mated together at their other ends to close the opening and vertical positions where the two closure plates are separated apart to open the opening; a solenoid mounted on the box end having a stop lever normally engaged with the two closure plates to hold them in their horizontal positions; a container removably mounted at the lower portion of the box, the container holding a viscons liquid; a bait support member for holding a bait; a detector connected to the bait support member for generating a detecting signal when a rat touches the bait, the solenoid being energized in response to the detecting signal to move the stop lever out of engagement with the two closure plates so that the closure plates are pivotally moved to their vertical positions to open the opening, thereby causing the rat to fall into the viscous liquid in the container; and a returning mechanism mounted on the box and operable to return the closure plates from their vertical to horizontal positions, upon returning of the closure plates to their horizontal positions the solenoid being de-energized through a control circuit to return the stop lever to its initial position to cause the stop lever to engage the closure plates, thereby holding them in their horizontal positions.

BRIEF DESCRIPTION OF THE INVENTION

DESCRIPTION OF THE PREFERRED EMBODIMENT

Figure 1:
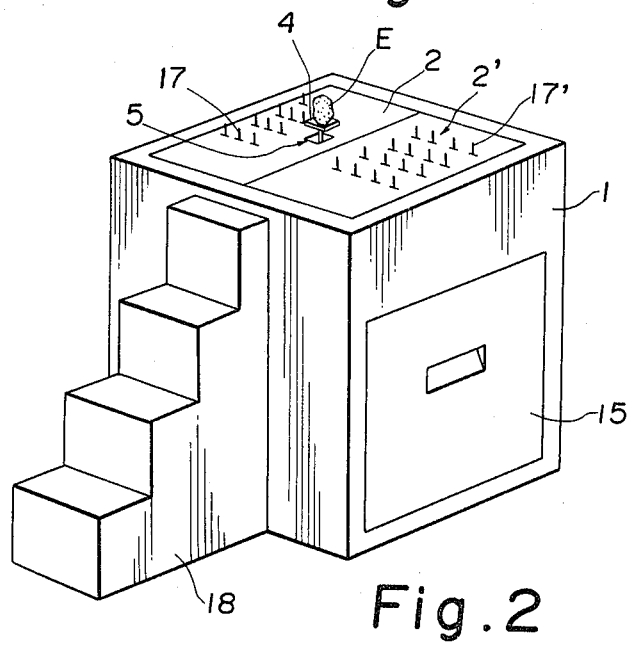
FIG. 1 is a perspective view of an automatic rat killing device according to the present invention.
Figure 2:
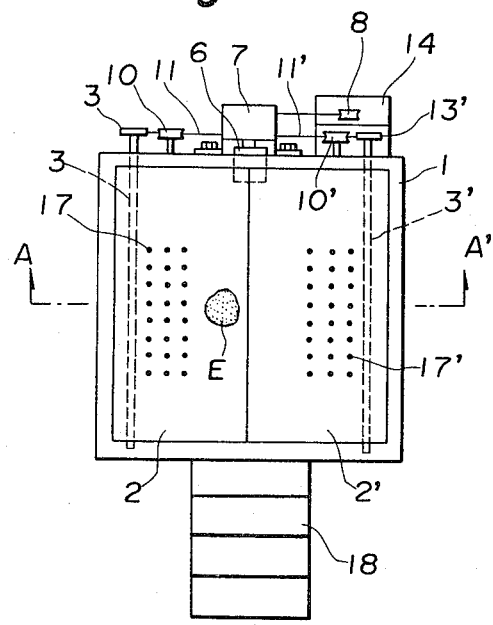
FIG. 2 is a plan view of the automatic rat killing device.
Figure 3:
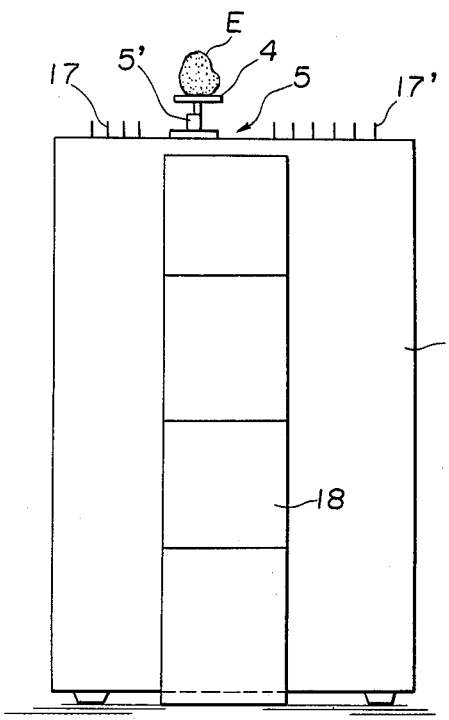
FIG. 3 is a front elevational view of the automatic rat killing device.

FIG. 1 shows an automatic rat killing device which comprises a box 1 having an opening at its top face. A pair of closure plates 2, 2' are mounted in this opening, the two closure plates 2, 2' being mated at the center of the opening. A pair of rotatable shafts 3, 3' extends horizontally through opposed side walls of the box 1 and are fixedly secured to the undersides of the respective closure plates 2, 2'. The closure plates 2, 2' are normally retained in their horizontal positions to close the top opening of the box 1, and are angularly movable about the shafts 3, 3' to their vertical positions to open the top opening.

A detector 5 is provided for detecting the arrival of a rat, the detector being in the form of a touch switch 5' mounted the closure plate 2 at the center of its marginal position adjacent to the other closure plate 2'. A bait support member 4 for holding a bait E is attached to an actuator rod of the touch switch 5' so that the touch switch 5' is activated when the rat touches the bait E.

The closure plates 2, 2' are normally retained in their horizontal positions by a stop lever 6 secured to a magnet core of a solenoid 7 mounted on the side wall of the box 1, the stop lever 6 being held against the undersides of the closure plates 2, 2' at one end of a contact line of the two closure plates 2, 2'. When the touch switch 5' is activated, the solenoid 7 is energized to retract the stop lever 6 so that the two closure plates 2, 2' are angularly moved by gravity from their horizontal to vertical positions to open the top opening of the box 1. The solenoid 7 is energized for a predetermined length of time to hold the stop lever 6 in its retracted position. This is achieved by a timer or relay in a control circuit contained an electric control device 14 mounted on the box 1.

A returning mechanism is provided for returning the closure plates 2, 2' to their initial horizontal positions. More specifically, a pair of arms 13, 13' are fixedly secured to the respective outer ends of the shafts 3, 3' extending outwardly from the side wall of the box 1. A vertical-disposed actuator lever 9 is pivotally mounted to the side wall of the box 1 by a pin O, the lever 9 having a major vertical portion 9A and a shorter portion 9B extending from the upper end of the major portion 9A and inclined relative thereto. A winding device 8 in the form of an electric motor is operatively connected to the lower end of the major portion 9A through a wire. The lower ends of the two arms 13, 13' are connected respectively to the free end of the shorter portion 9B of the actuator lever 9 by two wires 11, 11', the two wires 11, 11' passing round pulleys 10, 10', respectively. A pair of springs 12, 12' are secured at their one ends to the side wall of the box 1 and at their other ends to the wires 11, 11', respectively, to properly tension the wires 11, 11'.

Figure 4:
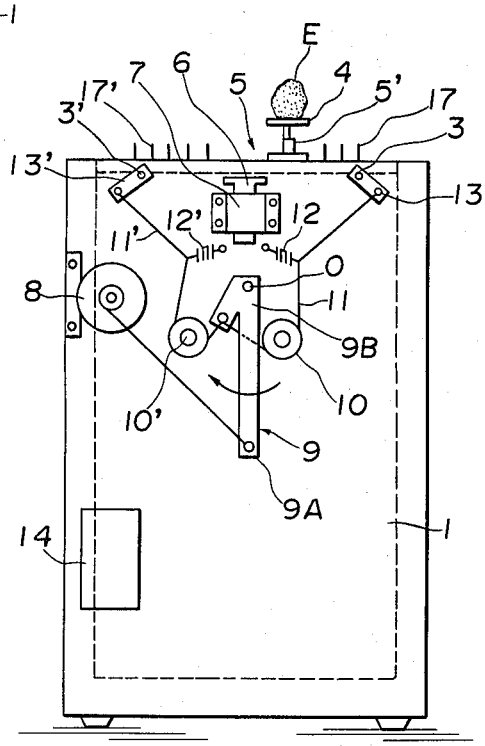
FIG. 4 is a rear elevational view of the automatic rat killing device.

When the actuator lever 9 is angularly moved about the pin O in a clockwise direction (FIG. 4) through the winding device 8, the shorter portion 9B of the actuator lever 9 is raised to haul the two wires 11, 11' simultaneously so that the arms 13, 13' are angularly moved to move the closure plates 2, 2' from their vertical to horizontal positions. The winding device 8 is actuated to angularly move the actuator lever 9 through a detecting means such as a limit switch when the closure plates 2, 2' start to move from their horizontal positions. This limit switch is electrically connected to the electric control circuit in the control device 14.

Figure 5:
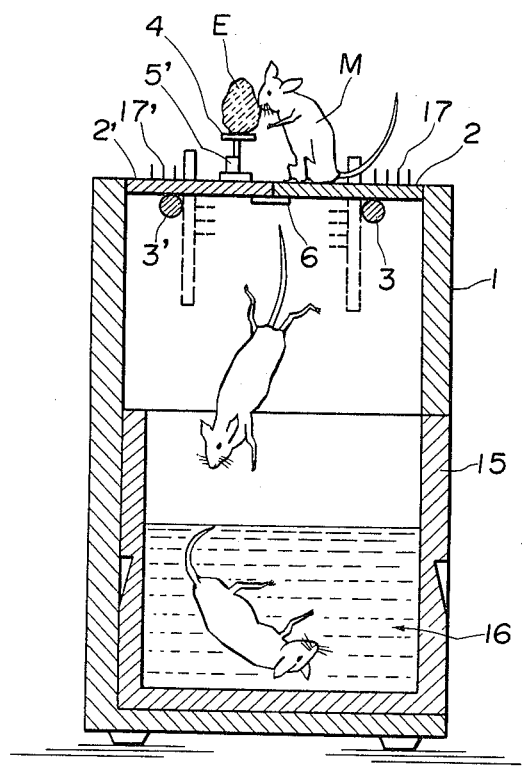
FIG. 5 is a cross-sectional view taken along the line A—A of FIG. 2.

As shown in FIG. 5, a withdrawable container 15 is received in the lower portion of the box 1, the container 15 holding a viscous liquid 16. Preferably, the viscous liquid 16 is of the antiseptic type. The container 15 need not to be of the withdrawable type and may be merely of the type which is placed on the bottom of the box 1.

As ascending means 18 in the form of a stairway is provided adjacent to the box 1 to allow the rat to come up to the closure plates 2, 2'. Guide means 17, 17' in the form of a plurality of pins are provided on the closure plates 2, 2' for guiding the rat to the bait E. The guide means 17, 17' may comprise nets.

The automatic rat killing device according to the present invention has an external configuration of a box so that the rat M comes up to the top of the box 1 through the stairway 18 without any fear. Then, the rat is guided to the bait E by the guide means 17, 17' and touches the bait E whereupon the touch switch 5' is activated to energize the solenoid 7 to retract the stop lever 6. Upon retraction of the stop lever 6, the closure plates 2, 2' are moved from their horizontal to vertical positions so that the rat is caused to fall into the viscous liquid 16 in the container 15. The closure plates 2, 2' so opened are immediately returned to their initial horizontal positions through the returning mechanism whereupon the solenoid 7 is deenergized to extend the stop lever 6 to retain the closure plates 2, 2' in their horizontal position.

Thus, the rat M drops into the viscous liquid 16 by gravity at such a velocity that the rat is completely sunk in the viscous liquid 16. Therefore, the entrapped rat is drowned to death instantaneously without generating any screaming. Such screaming constitutes a signal for informing other rats of a danger. Therefore, other rats can be entrapped in the rat killing device consecutively.

Preferably, the viscous liquid is formed by adding a coloring matter and a water solution of cationic soap to an odorless food adhesive, the viscous liquid being adjusted to a suitable viscosity. With this viscous liquid, sterlizing and antiseptic effects are imparted to the corpses of the entrapped rats for a long period of time. Also, the viscous liquid serves as an insecticide for preventing the corpses from becoming verminous. Therefore, the viscous liquid 16 need not to be changed frequently. Thus, the automatic rat killing device is quite easy in maintenance. In addition, the container 15 holding the viscous liquid 16 can be easily removed from the box 1 to throw away the corpses of the entrapped rats. Thus, this rat killing device is quite satisfactory from a sanitary point of view and can catch and kill a plurality of rats at the same place in a consecutive manner. This has not been achieved with the conventional rattraps and rat killing devices.

By virtue of the use of the viscous liquid, the rat killing device of this invention is simple in construction, and reliable in operation, and economical in use. Also, manufacturing costs and maintenance costs are low.

What is claimed is:

1. An automatic rat killing device comprising:
   (a) a box having an opening at its top and a stairway leading to its top;
   (b) a pair of closure plates pivotally mounted at their one ends on said box for movement between horizontal positions where said pair of closure plates are mated together at their other ends to close said opening and vertical positions where said pair of closure plates are separated apart to open said opening;
   (c) a solenoid mounted on said box and having a stop lever normally engaged with said closure plates to hold them in their horizontal positions;
   (d) a container removably mounted at the lower portion of said box, said container holding a viscous liquid;
   (e) a bait support member for holding a bait;
   (f) a detector connected to said bait support member for generating a detecting signal when a rat touches said bait, said solenoid being energized in response to said detecting signal to move said stop lever out of engagement with said closure plates so that said closure plates are pivotally moved to their vertical positions to open said opening, thereby causing the rat to fall into said viscous liquid in said container; and
   (g) a returning mechanism mounted on said box and operable to return said closure plates from their vertical to horizontal positions, upon returning of said closure plates to their horizontal positions said solenoid being de-energized to return said stop lever to its initial position to cause said stop lever to engage said closure plates, thereby holding them in their horizontal positions.

2. An automatic rat killing device according to claim 1, in which said detector comprises a touch switch having an actuator rod attached to said bait support member.

3. An automatic rat killing device according to claim 1, in which said returning mechanism comprises a winding device, and an actuator lever having a major vertical portion and a shorter portion extending from the upper end of said major portion and inclined relative thereto, said actuator lever being pivotally mounted at its upper end, said winding device being operatively connected to the lower end of said major portion for angularly moving said actuator lever, the free end of said shorter portion being operatively connected to said closure plates, whereby upon actuation of said winding device, said actuator lever is angularly moved so that said closure plates are moved from their vertical to horizontal positions.

* * * * *